(12) United States Patent
Suda

(10) Patent No.: US 7,502,062 B2
(45) Date of Patent: *Mar. 10, 2009

(54) CCD BREAKAGE PREVENTION SYSTEM

(75) Inventor: Tadaaki Suda, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 427 days.

This patent is subject to a terminal disclaimer.

(21) Appl. No.: 11/346,251

(22) Filed: Feb. 3, 2006

(65) Prior Publication Data

US 2006/0176385 A1  Aug. 10, 2006

(30) Foreign Application Priority Data

Feb. 4, 2005   (JP)   ............................ 2005-028777

(51) Int. Cl.
*H04N 5/335* (2006.01)
(52) U.S. Cl. .......................... 348/311; 348/298; 348/65
(58) Field of Classification Search .................. 348/65, 348/71, 72, 75, 73, 118, 294, 302, 311, 312, 348/372
See application file for complete search history.

(56) References Cited

U.S. PATENT DOCUMENTS

2006/0176384 A1* 8/2006 Suda .......................... 348/311

OTHER PUBLICATIONS

U.S. Appl. No. 11/346,252 to Suda, filed Feb. 3, 2006.
U.S. Appl. No. 11/346,250 to Suda, filed Feb. 3, 2006.

* cited by examiner

*Primary Examiner*—Ngoc-Yen T Vu
*Assistant Examiner*—Kent Wang
(74) *Attorney, Agent, or Firm*—Greenblum & Bernstein, P.L.C.

(57) ABSTRACT

A CCD control system is provided which can prevent CCD breakage caused by a latchup, etc. by having a function to detect two kinds of errors, Vsub error and power voltage error to prevent a latchup, etc. with placing the switching circuit in the CCD section, and the Vout signal monitoring circuit, without laying additional wiring to the CCD or making the diameter of the insertion tube larger. An electronic endoscope adopting the CCD control system is also provided which can prevent CCD breakage caused by a latchup, etc. The CCD control system includes a driving section that drives the CCD, a bias voltage generation section that generates a substrate bias voltage, a transmission line that transmits a output signal of the CCD, a transmission line alteration section that is placed on the transmission line, and a output signal monitoring section that is placed on the transmission line between the transmission line alteration section and the signal processing section for monitoring an output from the transmission line alteration section and sending a directive signal to stop supply of the drive signal to the driving section.

12 Claims, 3 Drawing Sheets

CCD BREAKAGE PREVENTION SYSTEM

BACKGROUND OF THE INVENTION

The present invention relates to a CCD control system for prevention of CCD breakage, and an endoscope which includes the CCD control system.

CCD (Charge Coupled Device) is a device that can transform an optical image of a subject formed on a receiving surface into electric signals with an opt-electric conversion. Usually, the electric signals are processed by a signal processing section incorporated in the CCD control unit outside the device, and are output as image signals. It is necessary to supply various kinds of power voltages and clock pulses to drive the CCD. One of the power voltages is a substrate bias voltage (hereinafter referred as to Vsub). Vsub is generated by a Vsub generation circuit. CCDs fall into two classes: an internal Vsub generation type that CCD includes a Vsub generation circuit, and an external Vsub generation type that CCD is supplied Vsub by a Vsub generation circuit incorporated in the CCD control unit outside the CCD.

An electronic endoscope is configured with an insertion tube which is inserted into a human cavity, an operation unit, a scope unit which includes cables and connectors for connection with a processor unit, and the processor unit which has an electric power supply and a light source supplied to the scope unit, and functions such as processing image signals from the scope unit to output to a monitor. Intensive research and development have been made to make the insertion tube as thinner as possible to reduce pain and suffering of patients and to enable observation inside of canals of a human body. Therefore, it is desirable that the smaller CCD is placed at the distal end of the insertion tube of the scope unit.

Because an external Vsub generation type CCD does not require a space for placing a Vsub generation circuit inside the device, it is possible to make the device smaller than an internal Vsub generation type CCD. On the other hand, the external Vsub generation type CCD requires a Vsub supply line from the CCD control unit which has the Vsub generation circuit extended to the CCD. Usually the CCD control unit is located in the scope, but near the processor unit, namely, near the connectors. So, the Vsub supply line is extended to the CCD installed at the distal end of the insertion tube through the scope as well as the other signal lines.

Therefore, in the case of an electronic endoscope with the external Vsub generation type CCD, it is highly possible that Vsub is not input to the CCD or the voltage level lowers, and the other signal, such as a clock pulse, is input, compared with in the case of an electronic endoscope with the internal Vsub generation type CCD. As a result, breakage of the external Vsub generation type CCD more likely caused by a latchup, etc. than the internal Vsub generation type CCD. Possible reasons why Vsub is not input may be a Vsub output error of the Vsub generation circuit such as output power loss of the circuit, a Vsub supply error from the Vsub generation circuit to the CCD such as short-circuit, wire breakage, bad electrical contact in a Vsup supply line. In the case of the electronic endoscope with the external Vsub generation type CCD, it is desirable that the other signal inputs than Vsub are stopped instantaneously when a Vsub output error is detected so as to prevent a latchup, etc.

On the other hand, in order to detect a Vsub supply error and prevent a latchup, etc., it is possible to place a device, etc. near the CCD to monitor Vsub. But in that case, an additional signal line to transmit a monitor signal to the CCD control circuit is required. Adding a signal line leads to a undesirable result that the diameter of the insertion tube becomes larger because extra space is necessary in the insertion tube for the line, and it is possible that wire breakage or shortage of the line occurs. Consequently, in the conventional electronic endoscope with the external Vsub generation type CCD, it is difficult to monitor Vsub near the CCD without adding a signal line. As a result, there is a problem that a latchup, etc. more likely causes CCD breakage than in the case of the internal Vsub generation type CCD, because the CCD receives a signal input in the condition that Vsub lowers.

SUMMARY OF THE INVENTION

The present invention is advantageous in that a CCD control system is provided that prevents CCD breakage caused by a latchup, etc. by detecting a Vsub output error and a Vsub supply error without any additional wiring to the CCD at the distal end of the scope which is required in case that a Vsub monitoring device is placed near the CCD. The present invention is also advantageous in that an electronic endoscope with the CCD control system is provided that prevents CCD breakage caused by a latchup, etc.

According to an aspect of the invention, there is provided a CCD control system including a driving section that supplies at least one drive signal to a CCD to drive the CCD, a bias voltage generation section that generates a substrate bias voltage, a conducting state switching section that selects one of a first state where the output signal passes through the conducting state switching section and a second state where a predetermined signal is output based on the substrate bias voltage, the conducting state switching section being placed on the transmission line, and an output signal monitoring section that monitors an output from the conducting state switching section and sends a directive signal to the driving section to stop supplying the drive signal when the output of the conducting state switching section is the predetermined signal, the output signal monitoring section being placed on the transmission line between the conducting state switching section and the signal processing section.

Since the configuration of the CCD control system in accordance with the present invention described above enables to detect a Vsub output error and a Vsub supply error and to stop the drive signal without adding any wiring, by placing various sections on the conventional output signal lines. Therefore, a latchup, etc., is prevented by stopping the drive signal instantaneously when an error occurs.

Optionally, the conducting state switching section may be in the first state (normal state) when the substrate bias voltage is equal or greater than a predetermined value, and may be in the second state (abnormal state) when the voltage is less than the predetermined value.

Optionally, the conducting state switching section may include a three-terminal switch including a signal input terminal to which the output signal is input, a signal output terminal which is connected to the output signal monitoring section and a GND terminal which is connected to the ground, the conducting state switching section switching the conducting state such that the signal input terminal is conducted to the signal output terminal in the first state, while the signal output terminal is conducted to the GND terminal in the second state.

Optionally, the output signal monitoring section may send the directive signal to the driving section to stop supplying the drive signal when the output signal voltage of the conducting state switching section is around a GND level.

Optionally, the output signal monitoring section may send an error detection signal together with the directive signal to the driving section to stop supplying the drive signal.

According to another aspect of the invention, there is provided an electronic endoscope system including: a scope having a driving section that supplies at least one drive signal to a CCD located at the distal end of the scope to drive the CCD, a bias voltage generation section that generates a substrate bias voltage, and a transmission line that transmits a CCD output signal to a signal processing section; a processor; a conducting state switching section that selects one of a first state where the output signal passes through the conducting state switching section and a second state where the a predetermined signal is output to an output signal monitoring section that monitors an output from the conducting state switching section, and sends a directive signal to the driving section to stop supplying the drive signal when the output of the conducting state switching section is the predetermined signal, and is placed on the transmission line between the conducting state switching section and the signal processing section.

With the configuration of the electronic endoscope in accordance with the present invention, without adding any wiring to the CCD placed at the distal end of the scope, placing various sections on the conventional output signal line enables detection of a Vsub supply error, and instantaneous stopping a drive signal to the CCD in order to prevent a latchup, etc.

Optionally, the conducting state switching section may be in the first state (normal state) when the substrate bias voltage is equal or greater than the predetermined value, and may be in the second state (abnormal state) when the voltage is less than the predetermined value.

Optionally, the conducting state switching section may include a three-terminal switch consisted of a signal input terminal to which the output signal is input, a signal output terminal which is connected to the output signal monitoring section and a GND terminal which is connected to the ground, the conducting state switching section switching the conducting state such that the signal input terminal is connected to the signal output terminal in the first state, the signal output terminal is connected to the GND terminal in the second state.

Optionally, the output signal monitoring section may send a directive signal to the driving section to stop supplying the drive signal when the output signal voltage of the conducting state switching section is around a GND level.

Optionally, the output signal monitoring section may send an error detection signal together with the directive signal to the driving section to stop supplying the drive signal.

Optionally, the conducting state switching section may be located near the CCD at the distal end of the scope.

Optionally, the driving section, the bias voltage generating section, the signal processing section and the output signal monitoring section may be placed near a proximal end where the scope is connected to the processor.

Therefore, the invention can provide a CCD control system with the above described configuration which can prevent CCD breakage caused by a latchup, etc. without adding any wiring to the CCD. That is because the drive signal is stopped when a Vsub output error or a Vsub supply error is detected. Further the invention can also provide an electronic endoscope with the CCD control system that can prevent CCD breakage caused by a latchup, etc. by detecting a Vsub output error and a Vsub supply error without placing any additional line inside the scope from the CCD at the distal end of the scope.

BRIEF DESCRIPTION OF THE ACCOMPANYING DRAWINGS

DETAILED DESCRIPTION OF THE EMBODIMENTS

Hereinafter, a CCD control system and an electronic endoscope according to an embodiment of the present invention will be described with reference to the accompanying drawings.

Figure 1:
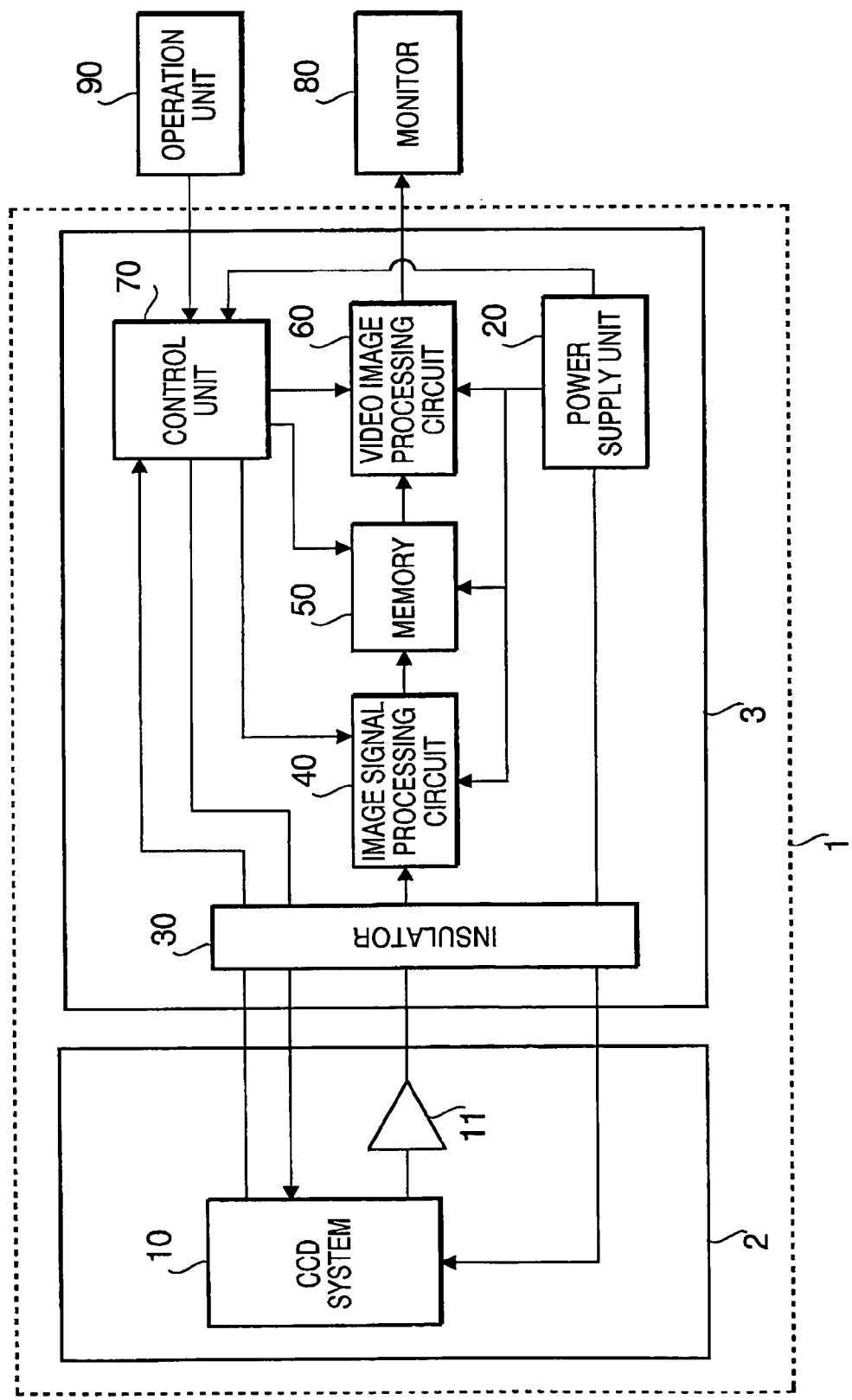
FIG. 1 is a function block diagram to show the configuration of the electronic endoscope system in an embodiment of the invention.

FIG. 1 is a function block diagram of an electronic endoscope 1 with a CCD control system according to an embodiment of the present invention. The electronic endoscope 1 includes a scope unit 2 and processor unit 3. The scope unit 2 and the processor unit 3 are connected by a connector (not shown). An operation unit 90 (like a keyboard) and a monitor 80 are connected to the processor unit 3.

The scope unit 2 includes an insertion tube, an operation unit, a forceps insertion port, cables, connectors, etc. (not shown). The scope unit 2 includes therein a CCD system 10 having a CCD section 100 and a CCD control circuit 200 (see FIG. 2), a signal driving circuit 11 which transmits image signals from the CCD system 10, and various other sections such as a light guide, a forceps channel, an operation cable, an air line, a water line (not shown). With handling the scope unit 2, an operator observes and operates inside a human cavity of a patient.

The processor unit 3 includes a power supply unit 20, an insulator 30, an image signal processing circuit 40, a memory section 50, a video image processing circuit 60, a control unit 70. The processor 3 also includes a light source unit having a lamp, an aperture and a RGB color filter (not shown). The power supply unit 20 supplies electronic power to the image signal processing unit 40, the memory section 50, the video image processing circuit 60, the control unit 70, the CCD system 10 and the signal driving circuit 11.

The insulator 30 have a function to provide electrical insulation between the scope unit 2 and the processor unit 3. The insulator 30 can be configured using any device which can transmit signals and voltages in an isolated state such as an isolation transformer, a photo coupler which includes a LED and a photo diode, or an equivalent IC module. Consequently, circuits in the scope unit 2 are electrically isolated from circuits in the processor unit 3. Therefore, the configuration can prevent an electric shock by an electric leakage to a patient.

Analog image signals output from the CCD system 10 are transmitted to the image signal processing circuit 40 through the signal driving circuit 11 and the insulator 30. The image signal processing circuit 40 applies A/D (analog-to-digital) conversion to the input image signals. The converted digital image signals are stored as R-signals, G-signals, B-signals, respectively, in predetermined areas of the memory section 50 at timing of synchronization signals supplied by the control unit 70. The memory section 50 is controlled by write memory synchronization signals, and then output R-signals, G-signals and B-signals.

Digital image signals which are output from the memory section 50 and synchronized, namely R-signals, G-signals and B-signals, are input to the video image processing circuit 60. The video processing circuit 60 performs D/A conversion, amplification, etc., of the signals, and outputs the signals to the monitor 80 as analog signals. With the monitor 80, an operator can observe and operate an affected area while viewing an image inside a human cavity. The operator can also see a still image with the monitor 80.

The control unit 70 controls the CCD system 10, the image signal processing circuit 40, the memory section 50 and the video image processing circuit 60. The control unit 70 receives signals from the operation unit 90 according to the operator's action and receives error detection signals from the CCD system 10 which are described later. For example, when an error detection signal is received, it is possible that the video image processing circuit 60 makes the monitor 80 to display the predetermined image or characters, etc., and it is also possible that the control unit 70 makes a buzzer or a speaker, etc. (not shown) to generate the predetermined sound. Due to the configuration, the operator can notice instantly that an error occurs in Vsub input to the CCD and driving of CCD stops.

The signal processing mechanism in the embodiment of the present invention described above is mainly to be applied to frame sequential endoscopes. However, the CCD control system and the electronic endoscope according to the invention can be applied to simultaneous endoscopes or other type of endoscopes.

Next, a CCD control system according to the embodiment of the invention will be described.

Figure 2:
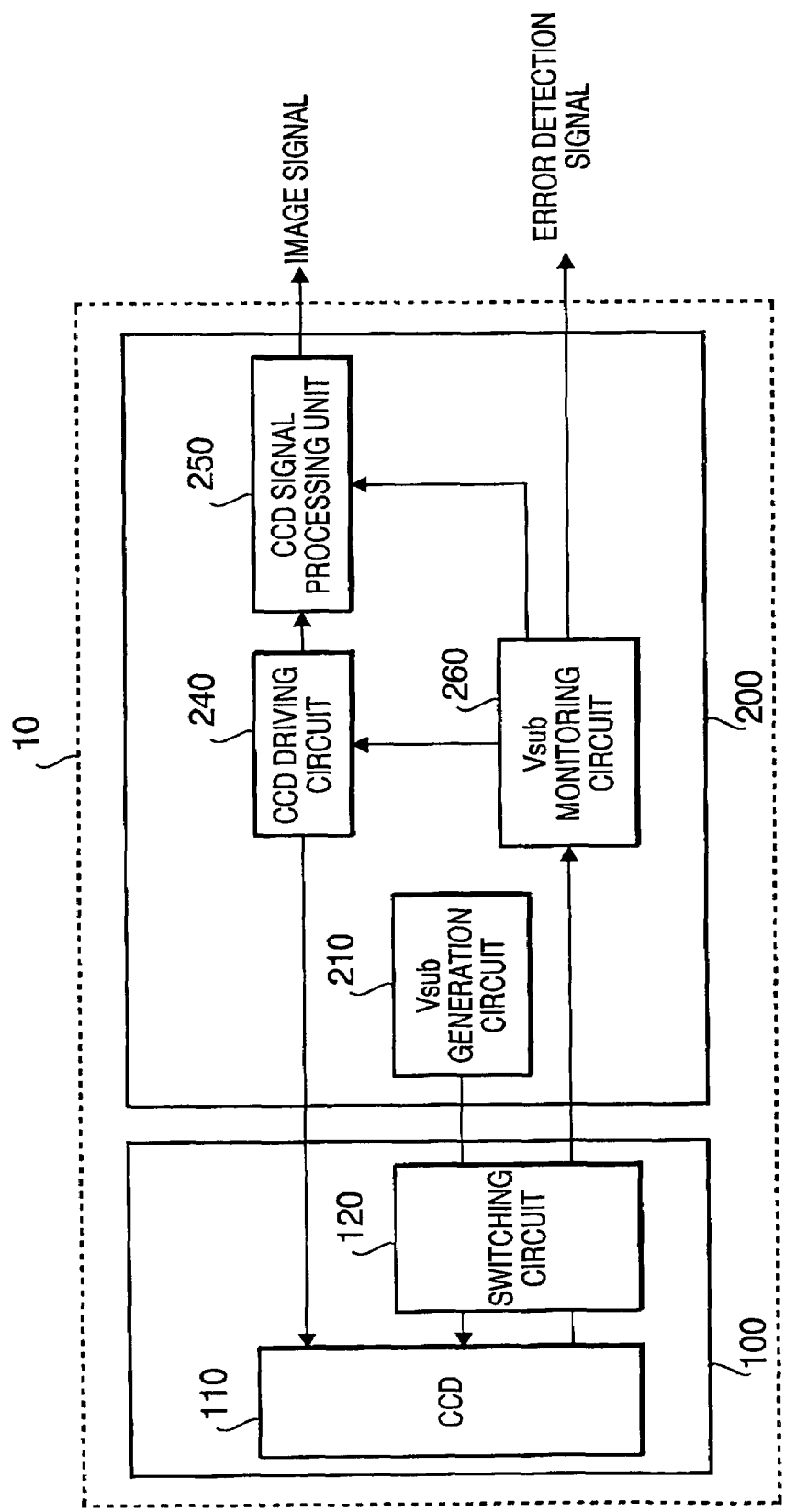
FIG. 2 is a function block diagram of the CCD system in the FIG. 1.

FIG. 2 is a function block diagram to show the details of the CCD system 10 shown in the FIG. 1. The CCD system 10 consists of the CCD section 100 and the CCD control circuit 200. The CCD section 100 is located at the distal end of the insertion tube of the scope unit 2, and includes a CCD 110 and a switching circuit 120. The CCD control circuit 200 is located near the connector of the scope unit 2, and includes a Vsub generation circuit 210, a CCD driving circuit 240, a CCD signal processing unit 250, and a Vout signal monitoring circuit 260. FIG. 2 does not show an electric power source or power supply lines, but each function block included in the CCD control circuit 200 is supplied power by the processor unit 3.

The CCD 110 is a charge coupled device which is one of photoelectric conversion devices. The CCD 110 converts an optical image of intensities of light on a receiving surface of the CCD 110 to signal charges according to the intensities. The output stage of the horizontal CCD is for converting the signal charges into signal voltage changes. The CCD 110 is a sensor device that has such an opt-electric conversion function and each element of the CCD is highly micronized. So, nanofabrication technology of semiconductor processes is applied to a fabrication process of the CCD. Therefore, parasitic transistors are inevitably generated inside the device. As a result, when an input signal voltage other than Vsub is above Vsub, a latchup, etc., occurs and heat generation leads to breakage of the device.

The CCD 110 receives Vsub generated by the Vsub generation circuit 210 and CCD input signals, such as multiple clock pulses, supplied by the CCD driving circuit 240, and transmits accumulated signal charges with photoelectric conversion, thus, outputs electronic signals. In the case of the external Vsub generation type CCD 110 according to the embodiment of the invention, an input terminal for Vsub and input terminals for clock pulses independently exist. Consequently, in the configuration, it is possible that only CCD signals other than Vsub are input while Vsub is not input to the CCD.

The CCD drive circuit 240 supplies multiple clock pulses, for example a horizontal drive pulse, a vertical drive pulse, a reset gate pulse, and the other various power voltages to the CCD 110.

The Vsub generation circuit 210 generates predefined Vsub with the power voltage supplied by the power supply unit 20 of the processors unit 3. The circuit supplies Vsub to the CCD 110 through the switching circuit 120. Because Vsub is the reference value of various electric potential distribution inside the CCD, the CCD does not work without the Vsub input. Usually, voltage values of CCD input signals other than Vsub are lower than Vsub. But in the case where Vsub is not input or Vsub lowers, the CCD input signal of which voltage is above Vsub causes a latchup, etc. In the embodiment of the present invention, the switching circuit 120 is placed as one way of detecting Vsub lowering, which has a function to switch according to the value of Vsub. When the switching circuit 120 is placed on the Vsub supply line, it is desirable to place the circuit as close as possible to the Vsub input terminal of the CCD 110 so as to make the distance to monitor longer and prevent a Vsub supply error generation between the circuit and the CCD 110. In the embodiment of the present invention, the switching circuit 120 is placed in the CCD section 100 at the distal end of the scope.

Figure 3:
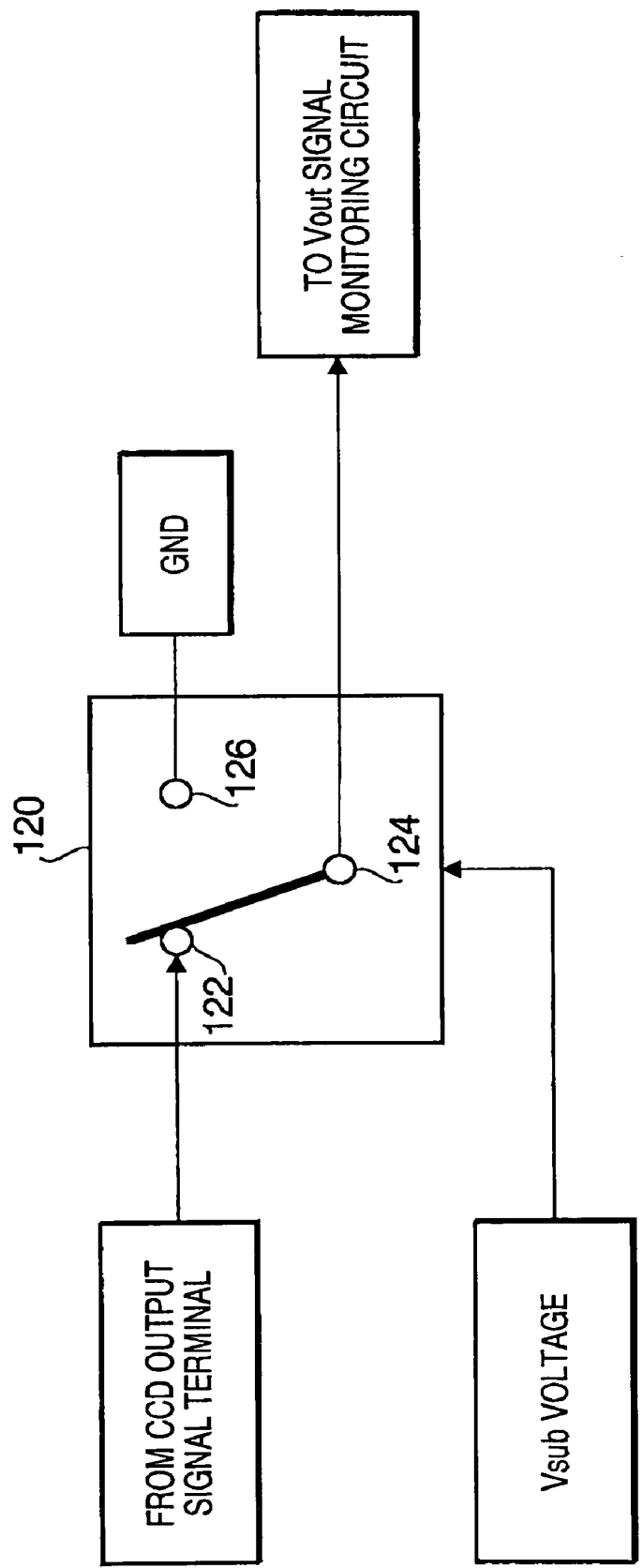
FIG. 3 is a diagram to show the switching circuit of the embodiment of the invention.

FIG. 3 is a conceptual diagram of the switching circuit 120. The switching circuit 120 may be configured as an IC such as a relatively small IC which includes an analog switching circuit and a comparator, etc. It is desirable for the switching circuit 120 to be smaller as possible, because the circuit is placed in the CCD section 100 at the distal end of the insertion tube of the scope unit 2. The switching circuit 120 includes at least the following three terminals: a terminal 122 connected to the signal output terminal of the CCD 110, a terminal 124 connected to the Vout signal monitoring circuit 260 and a terminal 126 connected to the ground GND, and a Vsub input terminal. The switching circuit has the following function. When Vsub is not input, the switching circuit conducts the terminal 124 to the terminal 126. The terminal 124 is connected to GND. When Vsub is equal or greater than the predetermined value, the circuit conducts the terminal 122 to the terminal 124 (first state (normal state)). When Vsub is less than the predetermined value, the circuit conducts the terminal 124 to the terminal 126 (second state (abnormal state)). Therefore, when normal Vsub, that is equal or greater than the predetermined value, is input, the output signal of the CCD 110 is transmitted to the Vout signal monitoring circuit 260. But when Vsub is not input because of a Vsub supply error or a Vsub output error, or Vsub is less than the predetermined value, the signal voltage detected by the Vout signal monitoring circuit 260 is at GND level, because the terminal 124 is conducted to the terminal 126.

The Vout signal monitoring circuit 260 (see FIG. 2) is placed on the output signal transmission line between the switching circuit 120 and the CCD signal processing unit 250, and monitors Vout signal voltage. When the Vout signal voltage is equal or less than the predetermined value, the circuit sends instantaneously a control signal to the CCD driving circuit 240 to stop supplying a drive signal. Namely, in the embodiment of the present invention, when Vsub lowering is detected at the switching circuit 120, the terminal 124 (that is the Vout monitoring circuit) is conducted to the terminal 126 (GND), then the signal voltage detected at the Vout signal monitoring circuit 260 instantly lowers to the GND level. Consequently, the Vout signal voltage is determined to be less than the predetermined value, the control signal is sent to the CCD driving circuit 240, and supplying the drive signal is able to be stopped. The Vout signal monitoring circuit 260 sends an error detection signal to the processor unit 3 while sending a control signal to the CCD drive circuit 240. The error detection signal is received by the control unit 70, and displays the predetermined message or image, and/or makes sound so as to notify a user of error occurrence.

The CCD signal processing unit 250 receives electronic signals output from the CCD 110, and performs given processes to convert the electronic signals to image signals based on a synchronization signal supplied by the CCD driving circuit 240. The processed image signals are output to the signal drive circuit 11 shown in the FIG. 1 as analog signals.

Consequently, the CCD control system according to the present invention can detect a Vsub error and a power voltage error, and then stop the CCD driving circuit so as to prevent CCD breakage caused by a latchup, etc., by means of placing the switching circuit 120 in the CCD section 100, and the Vout signal monitoring circuit 260, without laying additional wiring to the CCD 110 or making the diameter of the insertion tube larger. The endoscope adopting the CCD control system of the embodiment of the invention can detect a Vsub error and a power voltage error so as to prevent CCD breakage caused by a latchup, etc. without any additional wire to the CCD 110 placed at the distal end of the scope unit 2.

The present disclosure relates to the subject matter contained in Japanese Patent Application No. P2005-028777, filed on Feb. 4, 2005, which is expressly incorporated herein by reference in its entirely.

What is claimed is:

1. A CCD control system comprising:
   a driving section that supplies at least one drive signal to a CCD to drive the CCD;
   a bias voltage generation section that generates a substrate bias voltage;
   a transmission line that transmits an output signal from the CCD to a signal processing section;
   a conducting state switching section that selects one of a first state where the output signal passes through the conducting state switching section and a second state where a predetermined signal is output based on the substrate bias voltage, the conducting state switching section being placed on the transmission line; and
   an output signal monitoring section that monitors an output from the conducting state switching section and sends a directive signal to the driving section to stop supplying the drive signal when the output of the conducting state switching section is the predetermined signal, the output signal monitoring section being placed on the transmission line between the conducting state switching section and the signal processing section.

2. The CCD control system according to claim 1,
   wherein the conducting state switching section is in the first state when the substrate bias voltage is equal or greater than a predetermined value, the conducting state switching section being in the second state when the voltage is less than the predetermined value.

3. The CCD control system according to claim 1,
   wherein the conducting state switching section includes a three-terminal switch including a signal input terminal to which the output signal is input, a signal output terminal which is connected to the output signal monitoring section and a GND terminal which is connected to the ground, the conducting state switching section switching the conducting state such that the signal input terminal is connected to the signal output terminal in the first state, while the signal output terminal is connected to the GND terminal in the second state.

4. The CCD control system according to claim 3,
   wherein the output signal monitoring section sends the directive signal to the driving section to stop supplying the drive signal when the output signal voltage of the conducting state switching section is around a GND level.

5. The CCD control system according to claim 1,
   wherein the output signal monitoring section sends an error detection signal together with the directive signal to the driving section to stop supplying the drive signal.

6. An electronic endoscope system comprising:
   a scope including a driving section that supplies at least one drive signal to a CCD located at the distal end of the scope to drive the CCD, a bias voltage generation section that generates a substrate bias voltage, and a transmission line that transmits a CCD output signal to a signal processing section;
   a processor;
   a conducting state switching section that selects one of a first state where the output signal passes through the conducting state switching section and a second state where a predetermined signal is output to an output signal monitoring section that monitors an output from the conducting state switching section, and sends a directive signal to the driving section to stop supplying the drive signal when the output of the conducting state switching section is the predetermined signal, and is placed on the transmission line between the conducting state switching section and the signal processing section.

7. The electronic endoscope system according to claim 6,
   wherein the conducting state switching section is in the first state when the substrate bias voltage is equal or greater than a predetermined value, and is in the second state when the voltage is less than the predetermined value.

8. The electronic endoscope system according to claim 6,
   wherein the conducting state switching section includes a three-terminal switch consisted of a signal input terminal to which the output signal is input, a signal output terminal which is connected to the output signal monitoring section and a GND terminal which is connected to the ground, the conducting state switching section switching the conducting state such that the signal input terminal is connected to the signal output terminal in the first state, the signal output terminal being connected to the GND terminal in the second state.

9. The electronic endoscope system according to claim 8,
   wherein the output signal monitoring section sends a directive signal to the driving section to stop supplying the drive signal when the output signal voltage of the conducting state switching section is around a GND level.

10. The electronic endoscope system according to claim 6,
    wherein the output signal monitoring section sends an error detection signal together with the directive signal to the driving section to stop supplying the drive signal.

11. The electronic endoscope system according to claim 6,
    wherein the conducting state switching section is located near the CCD at the distal end of the scope.

12. The electronic endoscope system according to claim 6,
    wherein the driving section, the bias voltage generating section, the signal processing section and the output signal monitoring section are placed near a proximal end where the scope is connected to the processor.

* * * * *